US012602175B2

(12) United States Patent
Zhang et al.

(10) Patent No.: US 12,602,175 B2
(45) Date of Patent: Apr. 14, 2026

(54) CHARGE DOMAIN COMPUTE-IN-DRAM FOR BINARY NEURAL NETWORK

(71) Applicant: Micron Technology, Inc., Boise, ID (US)

(72) Inventors: Wenlun Zhang, Chofu (JP); Yuan He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/761,148

(22) Filed: Jul. 1, 2024

(65) Prior Publication Data

US 2025/0217052 A1 Jul. 3, 2025

Related U.S. Application Data

(60) Provisional application No. 63/614,989, filed on Dec. 27, 2023.

(51) Int. Cl.
*G06F 3/06* (2006.01)

(52) U.S. Cl.
CPC .......... *G06F 3/0625* (2013.01); *G06F 3/0659* (2013.01); *G06F 3/0673* (2013.01)

(58) Field of Classification Search
CPC ........ G06F 3/06; G06F 3/0659; G06F 3/0673; G06F 3/0693; G06F 3/0625; G06F 3/0679; G06F 3/0653
See application file for complete search history.

(56) References Cited

U.S. PATENT DOCUMENTS

| | | | | |
|---|---|---|---|---|
| 10,679,696 B2 * | 6/2020 | Liu | .................... | G11C 13/0033 |
| 11,354,383 B2 * | 6/2022 | Guo | ...................... | G06F 7/5443 |
| 2020/0035305 A1 * | 1/2020 | Choi | .................. | G11C 13/0028 |

(Continued)

FOREIGN PATENT DOCUMENTS

| | | | | | |
|---|---|---|---|---|---|
| EP | | 3407203 A3 * | 3/2019 | ........... | G06F 3/0673 |
| WO | WO-2018197689 A1 * | | 11/2018 | ............. | G06N 3/044 |

OTHER PUBLICATIONS

Z. Yue, Y. Wang, Y. Qin, L. Liu, S. Wei and S. Yin, "BR-CIM: An Efficient Binary Representation Computation-In-Memory Design," in IEEE Transactions on Circuits and Systems I: Regular Papers, vol. 69, No. 10, pp. 3940-3953, Oct. 2022.*

(Continued)

*Primary Examiner* — Pierre Michel Bataille
(74) *Attorney, Agent, or Firm* — Fletcher Yoder, P.C.

(57) ABSTRACT

Methods and systems for computing in-dynamic random access memory (DRAM) computing include loading a first group of cells of the DRAM with input parameters and loading a second group of cells of the DRAM with inverted input parameters that are each complementary to corresponding input parameters. An offset group of cells of the DRAM is loaded with an indication of an offset voltage. An operation is performed on weights with corresponding stored input parameters or the stored inverted input parameters, and a column of the first group and the second group is activated to perform an accumulation of the operations of weights for cells in the column to store a sum. An offset voltage is generated using the indication, and an output is generated based on the comparison of the sum and the offset voltage and is stored in an output group of cells of the DRAM.

20 Claims, 8 Drawing Sheets

(56)                References Cited

U.S. PATENT DOCUMENTS

| | | | | |
|---|---|---|---|---|
| 2020/0176064 A1* | 6/2020 | Finkbeiner | ............. | G11C 7/065 |
| 2020/0356286 A1* | 11/2020 | Willcock | ............. | G11C 7/1006 |
| 2021/0397931 A1* | 12/2021 | Hoang | ................... | G06N 3/048 |
| 2022/0342640 A1* | 10/2022 | Tsukamoto | ............ | H10B 51/20 |
| 2023/0370082 A1* | 11/2023 | Lee | ........................ | G11C 11/419 |
| 2025/0013716 A1* | 1/2025 | Filipiak | ................... | G06F 17/16 |

OTHER PUBLICATIONS

S. Roy, M. Ali and A. Raghunathan, "PIM-DRAM: Accelerating Machine Learning Workloads Using Processing in Commodity DRAM," in IEEE Journal on Emerging and Selected Topics in Circuits and Systems, vol. 11, No. 4, pp. 701-710, Dec. 2021.*

M. Ali, S. Roy, U. Saxena, T. Sharma, A. Raghunathan and K. Roy, "Compute-in-Memory Technologies and Architectures for Deep Learning Workloads," in IEEE Transactions on Very Large Scale Integration (VLSI) Systems, vol. 30, No. 11, pp. 1615-1630, Nov. 2022.*

A. Appukuttan, E. Thomas, H. R. Nair, H. S, D. K. J and M. A. Azeez, "In-Memory Computing Based Hardware Accelerator Module for Deep Neural Networks," 2022 IEEE 19th India Council International Conference (INDICON), Kochi, India, 2022, pp. 1-6.*

P.-F. Chiu, W. H. Choi, W. Ma, M. Qin and M. Lueker-Boden, "A Binarized Neural Network Accelerator with Differential Crosspoint Memristor Array for Energy-Efficient MAC Operations," 2019 IEEE International Symposium on Circuits and Systems (ISCAS), Sapporo, Japan, 2019, pp. 1-5.*

Ashok K. Sharma, "HighPerformance Dynamic Random Access Memories," in Advanced Semiconductor Memories: Architectures, Designs, and Applications , IEEE, 2003, pp. 129-235, ch3.*

V. Tyagi, V. Rana, L. Capecchi, M. Carissimi and M. Pasotti, "Power Efficient Sense Amplifier For Emerging Non Volatile Memories," 2020 33rd International Conference on VLSI Design and 2020 19th International Conference on Embedded Systems (VLSID), Bangalore, India, 2020, pp. 7-12.*

H. H. Qu and B. F. Cockburn, "Performance evaluation of three memory sense amplifiers with input offset cancellation," Canadian Conference on Electrical and Computer Engineering 2004 (IEEE Cat. No. 04CH37513), Niagara Falls, ON, Canada, 2004, pp. 1927-1930, vol. 4.*

Sanghoon Hong, Sejun Kim, Jae-Kyung Wee and Seongsoo Lee, "Low-voltage DRAM sensing scheme with offset-cancellation sense amplifier," in IEEE Journal of Solid-State Circuits, vol. 37, No. 10, pp. 1356-1360, Oct. 2002.*

* cited by examiner

LOAD  DRAM  WITH  INPUT  PARAMETERS ~162

LOAD  DRAM  WITH  OFFSET ~164

INVERT  INPUT  PARAMETERS  IN  DRAM ~166

PERFORM  OPERATION  OF  WEIGHTS
WITH  INPUT  PARAMETERS  IN  DRAM ~168

ACTIVATE  COLUMN  TO  OBTAIN  MAC  RESULT ~170

GENERATE  OFFSET  VOLTAGE ~172

GENERATE  AND  STORE  OUTPUT ~174

CHARGE DOMAIN COMPUTE-IN-DRAM FOR BINARY NEURAL NETWORK

CROSS-REFERENCE TO RELATED APPLICATIONS

This application claims priority to U.S. Provisional Application No. 63/614,989, filed Dec. 27, 2023, which is incorporated by reference herein in its entirety.

BACKGROUND

Field of the Present Disclosure

Embodiments of the present disclosure relate generally to memory devices. More specifically, embodiments of the present disclosure relate to compute-in-dynamic random-access memory in the charge domain.

Description of Related Art

Generally, a computing system may include electronic devices that, in operation, communicate information via electrical signals. For example, a computing system may include a processor communicatively coupled to a memory device, such as a dynamic random-access memory (DRAM) device. In this manner, the processor may communicate with the memory device, for example, to retrieve executable instructions, retrieve data to be processed, by the processor, and/or store data output from the processor.

Deep neural networks are growing in popularity due to excelling at performing machine learning tasks, such as image classification, speech recognition, anomaly detection, and other tasks. Basic computing operations using deep neural networks are performed using multiplication and accumulation that requires frequent memory reads and writes. These frequent reads and writes by the processor from the DRAM greatly increases power consumption and greatly lowers throughput of the tasks.

Embodiments of the present disclosure may be directed to one or more of the problems set forth above.

DETAILED DESCRIPTION

Figure 1:
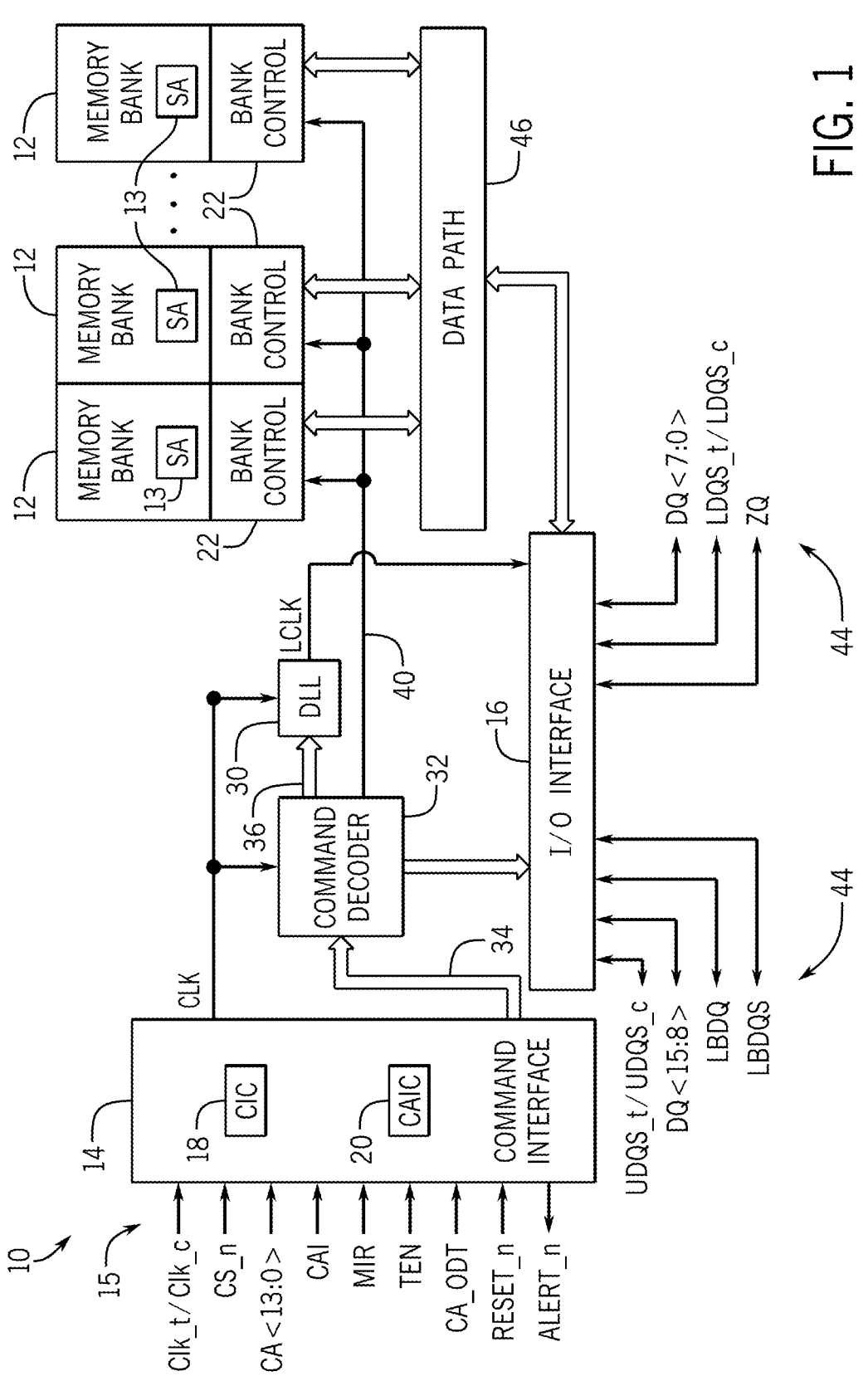
FIG. 1 is a simplified block diagram illustrating certain features of a memory device having sense amplifiers, memory banks, and bank controls, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As previously discussed, deep neural networks (DNNs) may be used to perform machine learning tasks. However, using DNNs with traditional processor-based processing uses frequent reads and writes from memory negatively impacting power consumption and throughput in performing the tasks. In-memory computing may be applied, but in-memory computing is not typically applied to dynamic random-access memory (DRAM) devices. The following presents an in-DRAM computation method implementing analog computation in the charge domain in the DRAM. The DRAM can realize bit-serial XNOR for multiply-and-accumulate operations in computation of a binary neural network (BNN).

BNNs simplify weight and input parameters to +1 or −1. The BNNs also may use a sign (sgn) function to reduce an output of a result to +1 or −1 as well. For instance, a BNN may use the following transform:

$$z_n = \mathrm{sgn}\left(\left(L_{i=0}^{N-1} w_{i,n} x_{i,n} + a_n\right)\right), \qquad \text{(Equation 1)}$$

where $w_{i,n}$ is the weight parameter, $x_{i,n}$ is the input parameter, and an is an offset parameter. The offset parameter may be a reduced parameter combining one or more batch normalization parameters and filter biases. Using the transform, if the multiply-accumulate (MAC) sum is larger than the offset, the output (Zn) will be +1. Otherwise the output will be −1. As an example, the filter weights may include the following set: +1, +1, −1, +1, −1, +1, +1, −1, and +1, and the input parameters include the following set: +1, −1, −1, −1, −1, +1, −1, −1, and +1. When the BNN XNORs these two values together, the MAC sum is +3 that when submitted to the sign function with the offset provides the output. If the offset is a value less than +3 (e.g., −2), the output will be +1. Otherwise, the output will be −1.

In memory, these +1 and −1 values may be implemented as a first value (e.g., 1) for +1 and a second value (e.g., 0) for −1. Furthermore, word-lines may be used to represent the weights. The input parameters are stored in multibit cells. In-memory computation in the charge domain using such representations may be a substantially high parallelism computation. Such computations may also leverage the high density of DRAM array of cells to be compatible to various filter sizes and input feature sizes. Furthermore, since the computation may be fully performed in the DRAM to generate the output, the extraneous reads and writes of CPU-based computation are omitted leading to significantly better power efficiency and throughput when using the in-DRAM compute.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type five synchronous dynamic random-access memory (DDR5 SDRAM) device. Various features of DDR5 SDRAM allow for reduced power consumption, more bandwidth and more storage capacity compared to prior generations of DDR SDRAM.

The memory device 10 may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x8 or x16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabyte (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization, and sizes of the memory banks 12 on the memory device 10 may be utilized depending on the application and design of the overall system.

The memory banks 12 and/or bank control blocks 22 include sense amplifiers 13. As previously noted, sense amplifiers 13 are used by the memory device 10 during sense operations. Specifically, sense circuitry of the memory device 10 utilizes the sense amplifiers 13 to receive low voltage (e.g., low differential) signals from the memory cells of the memory banks 12 and amplifies the small voltage differences to enable the memory device 10 to interpret the data properly.

The memory device 10 may include a command interface 14 and an input/output (I/O) interface 16. The command interface 14 is configured to provide a number of signals (e.g., signals 15) from an external (e.g., host) device (not shown), such as a processor or controller. The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, the true clock signal Clk_t and the bar/complementary clock signal Clk_c. The positive clock edge for DDR refers to the point where the rising true clock signal Clk_t crosses the falling complementary clock signal Clk_c, while the negative clock edge indicates transition of the falling true clock signal Clk_t and the rising of the complementary clock signal Clk_c. Commands (e.g., read command, write command, activate command, precharge command, etc.) are typically entered on the positive edges of the clock signal and data is transmitted or received on both the positive and negative clock edges.

The clock input circuit 18 receives the true clock signal Clk_t and the complementary clock signal Clk_c and generates an internal clock signal CLK. The internal clock signal CLK is supplied to an internal clock generator, such as a delay locked loop (DLL) circuit 30. The DLL circuit 30 generates a phase controlled internal clock signal LCLK based on the received internal clock signal CLK. The phase controlled internal clock signal LCLK is supplied to the I/O interface 16, for instance, and is used as a timing signal for determining an output timing of read data. In some embodiments, the clock input circuit 18 may include circuitry that splits the clock signal into multiple (e.g., 4) phases. The clock input circuit 18 may also include phase detection circuitry to detect which phase receives a first pulse when sets of pulses occur too frequently to enable the clock input circuit 18 to reset between sets of pulses.

The internal clock signal(s)/phases CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the DLL circuit 30 over the bus 36 to coordinate generation of the phase controlled internal clock signal LCLK. The phase controlled internal clock signal LCLK may be used to clock data through the IO interface 16, for instance.

Further, the command decoder 32 may decode commands, such as read commands, write commands, mode-register set commands, activate commands, precharge commands, etc., and provide access to a particular memory bank 12 corresponding to the command, via the bus path 40. As will be appreciated, the memory device 10 may include various other decoders, such as row decoders and column decoders, to facilitate access to the memory banks 12. In one embodiment, each memory bank 12 includes the bank control block 22 which provides the necessary decoding (e.g., row decoder and column decoder), as well as other features, such as timing control and data control, to facilitate the execution of commands to and from the memory banks 12.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t and Clk_c). The command interface may include a command address input circuit 20, which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus, for instance, depending on the command/address routing for the particular memory device 10. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data may be sent to and from the memory device 10, utilizing the command and clocking signals discussed above, by transmitting and receiving data signals 44 through the IO interface 16. More specifically, the data may be sent to or retrieved from the memory banks 12 over the datapath 46, which includes a plurality of bi-directional data buses. Data IO signals, generally referred to as DQ signals, are generally transmitted and received in one or more bi-directional data busses. For certain memory devices, such as a DDR5 SDRAM memory device, the IO signals may be divided into upper and lower bytes. For instance, for a x16 memory device, the IO signals may be divided into upper and lower IO signals (e.g., DQ<15:8> and DQ<7:0>) corresponding to upper and lower bytes of the data signals, for instance.

To allow for higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_c), the DQS signals may be provided as a differential pair of data strobe signals (DQS_t and DQS_c) to provide differential pair signaling during reads and writes. For certain memory devices, such as a DDR5 SDRAM memory device, the differential pairs of DQS signals may be divided into upper and lower data strobe signals (e.g., UDQS_t and UDQS_c; LDQS_t and LDQS_c) corresponding to upper and lower bytes of data sent to and from the memory device 10, for instance.

An impedance (ZQ) calibration signal may also be provided to the memory device 10 through the IO interface 16. The ZQ calibration signal may be provided to a reference pin and used to tune output drivers and ODT values by adjusting pull-up and pull-down resistors of the memory device 10 across changes in process, voltage, and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the IO pins.

In addition, a loopback data signal (LBDQ) and loopback strobe signal (LBDQS) may be provided to the memory device 10 through the IO interface 16. The loopback data signal and the loopback strobe signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both LBDQ and LBDQS or possibly just a loopback data pin. This is generally intended to be used to monitor the data captured by the memory device 10 at the IO interface 16. LBDQ may be indicative of a target memory device, such as memory device 10, data operation and, thus, may be analyzed to monitor (e.g., debug and/or perform diagnostics on) data operation of the target memory device. Additionally, LBDQS may be indicative of a target memory device, such as memory device 10, strobe operation (e.g., clocking of data operation) and, thus, may be analyzed to monitor (e.g., debug and/or perform diagnostics on) strobe operation of the target memory device.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory device 10. Accordingly, it should be understood that the block diagram of FIG. 1 is only provided to highlight certain functional features of the memory device 10 to aid in the subsequent detailed description. Furthermore, although the foregoing discusses the memory device 10 as being a DDR5 device, the memory device 10 may be any suitable device (e.g., a low-power double data rate (LPDDR) device, a double data rate type 4 DRAM (DDR4) device, another DRAM type, or a combination of different types of memory devices).

Figure 2:
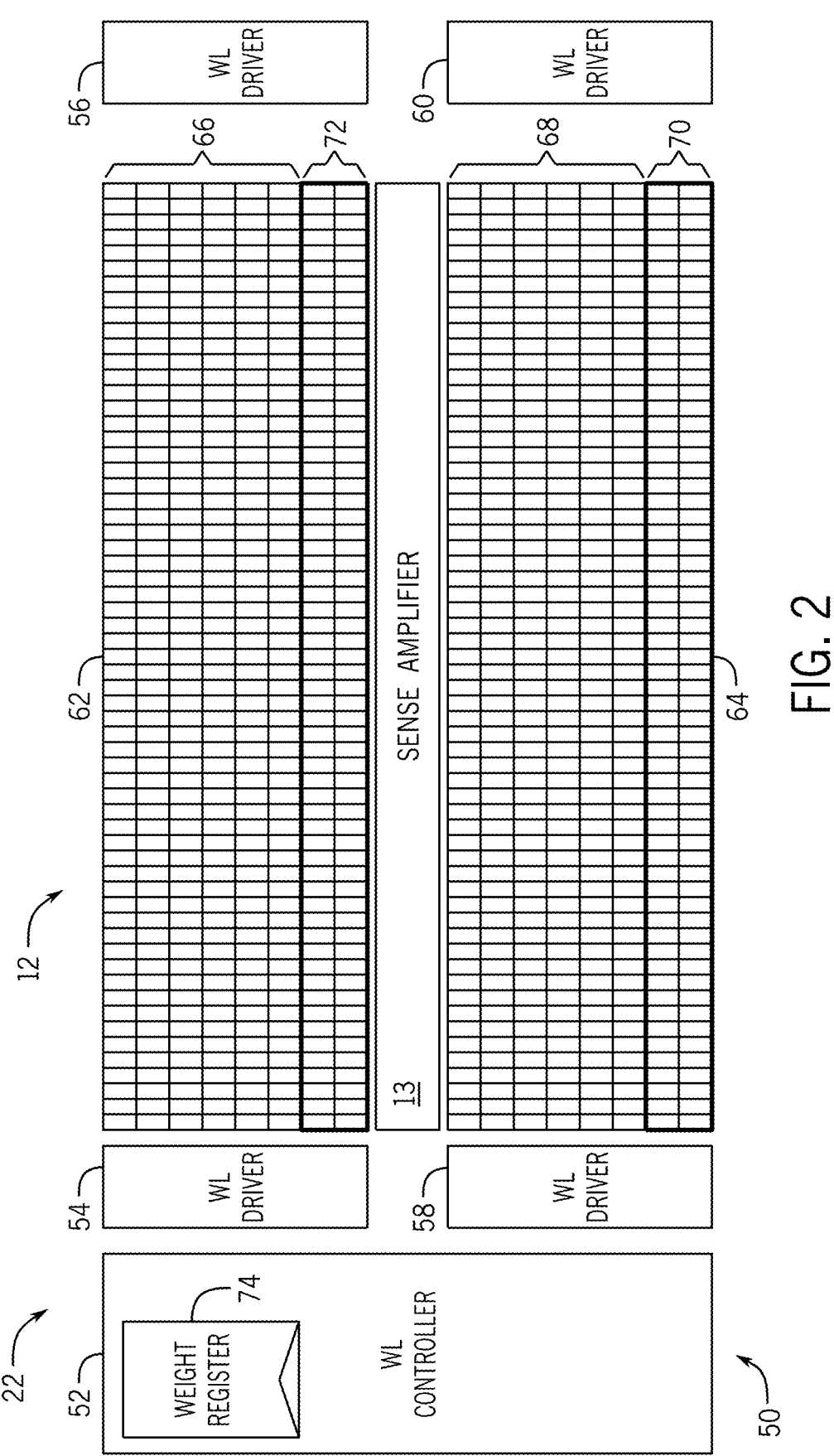
FIG. 2 is a block diagram of a portion of the memory device of FIG. 1 showing portions of the sense amplifier, the memory bank, and the bank controls used to perform in-device computations in the charge domain, according to an embodiment of the present disclosure.

FIG. 2 is a block diagram of a system 50 that includes portions of the memory bank 12, the sense amplifier 13, and the bank control 22 of the memory device 10 of FIG. 1. As illustrated, the bank control 22 includes a word line (WL) controller 52 that controls WL drivers 54, 56, 58, and 60. WL drivers 54 and 56 control access to cells of the memory bank 12 in a first array core 62, and the WL drivers 58 and 60 control access to cells of the memory bank 12 in a second array core 64. Although, the WL drivers 54, 56, 58, and 60 are displayed as monolithic drivers, each may include more than one WL driver. For instance, the WL drivers 54, 56, 58, and 60 may include a WL for each row or for groups of rows. The WL drivers 54, 56, 58, and 60 may be used to read and write data from selected cells by asserting a WL. As discussed below, the WL drivers 54, 56, 56, and 60 may be used to load weights for the BNN to perform the MAC discussed previously.

The first array core 62 may include a first group 66 of cells that may be used to load in input parameters using a memory write. Similarly, the second array core 62 may include a second group 68 of cells that are used to load in complementary input parameters. In some embodiments, the input parameters stored in the first group 66 may be inverted and in the second group 68 by activating WLs of the first group 66 using the WL drivers 54 and/or 56. The sense amplifier 13 is then activated with WLs of the second group 68 being activated to invert the data from respective cells of the first group 66 by storing the inverted values from the corresponding digit line (e.g., DLF) into corresponding cells of the second group 68. In some embodiments, both the first group 66 and the second group 68 may be written using traditional memory writes.

The first array core 62 also includes an output group 72 of cells used to store the output of the MAC and compare as an output of the BNN and/or for use in a next convolutional layer as part of the machine learning. The output group 72 may include one or more rows of cells. The second array core 64 also includes an offset group 70 that may be used to store the offset used in the compare for the BNN. As discussed more below, the offset may be stored as a digital code that is used to control the analog offset charge to determine the result from the compare (e.g., 0 or 1 also known as −1 and +1, respectively).

Figure 3:
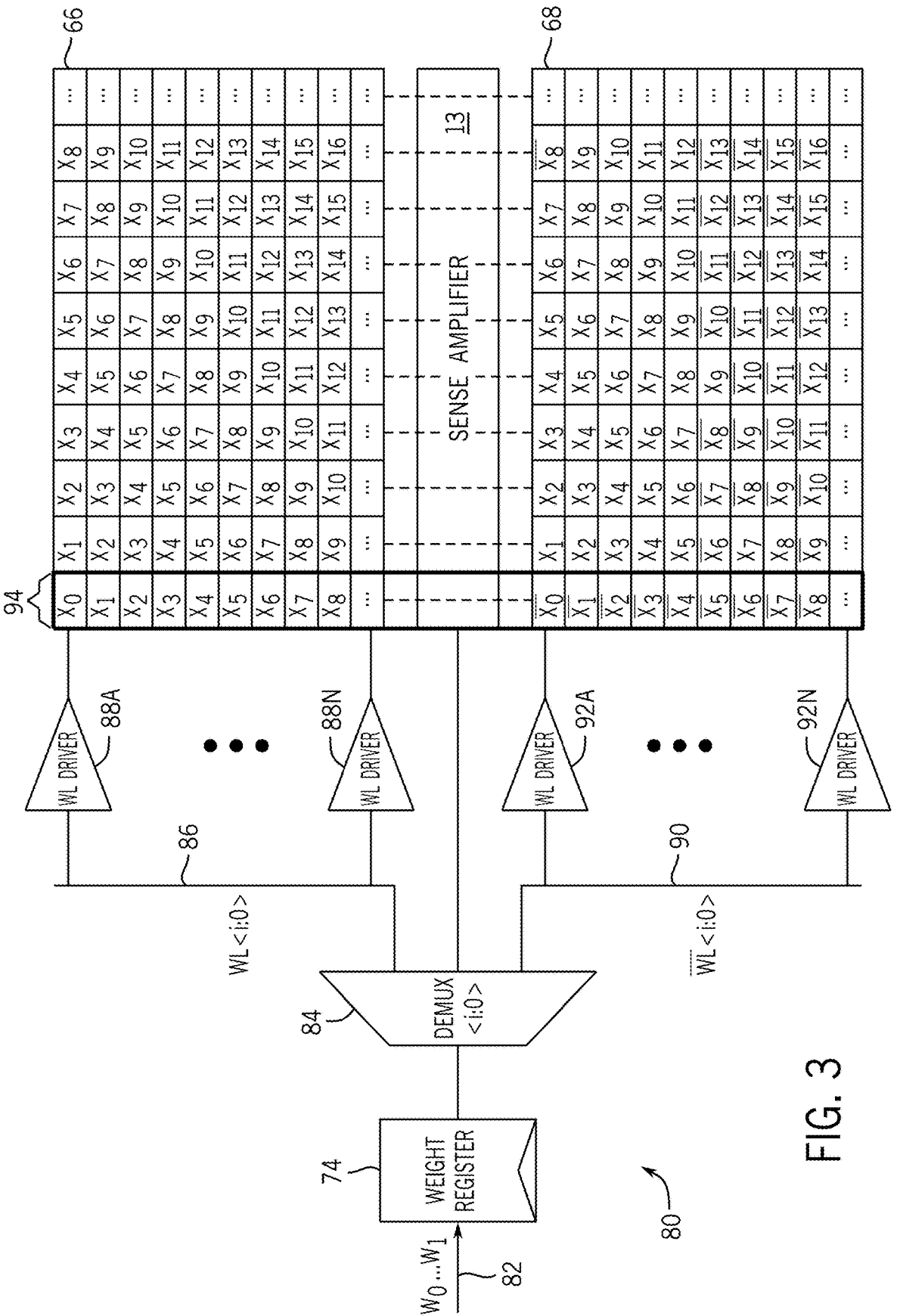
FIG. 3 is a block diagram of a part of the portion of FIG. 1 showing portions of the sense amplifier, the memory bank, and the bank controls used to determine a multiply-and-accumulate (MAC) sum in one or more columns of the memory banks, according to an embodiment of the present disclosure.

FIG. 3 is a block diagram of a system 80 used to perform the multiply and accumulate process that includes the first group 66 and the second group 68 and the weight register 74. The weight register 74 receives and stores weights 82. When a corresponding weight 82 (e.g., $w_2$) is a first value (e.g., 1 indicative of +1), a demultiplexer 84 causes a corresponding WL 86 (e.g., WL<2>) to be activated via a WL driver 88 (individually referred to as WL 88A and 88B). Likewise, when a corresponding weight 82 (e.g., $w_3$) is a second value (e.g., 0 indicative of −1), the demultiplexer causes a corresponding WL 90 (e.g., WL<3>) to be activated via a WL driver 92 (individually referred to as WL 92A and 92B). In some embodiments, the WL drivers 88 and 92 may be fired simultaneously. By leveraging capacitive characteristics of the DRAM an XNOR operation may be performed resulting in the following truth table:

TABLE 1

Truth table with weight and input parameter values.

| Weight $w_i$ | Input parameter $x_i$ | Result |
|:---:|:---:|:---:|
| 0 | 0 | 1 |
| 0 | 1 | 0 |
| 1 | 0 | 0 |
| 1 | 1 | 1 |

This principle is true since a weight of the first value causes the input parameter to be added directly to a column 94 while a weight of the second value causes an inverse of the input parameter to be added directly to the column 94.

In other words, a cell of the column may be used to perform the XNOR operation of Table 1 while the column may be used to accumulate all of the XNOR operations in the column 94. For instance, the accumulation may be performed on digit lines (e.g., DLT and DLF) of the column 94. The sense amplifier 13 may then store the MAC value of the column 94 on a first digit line (e.g., DLT) while decoupling the other digit line and enabling the other digit line (e.g., DLF) to be pre-charged to another (e.g., lower) voltage in preparation for generation of an offset voltage to be used for evaluation of a comparison of the MAC to the offset voltage, as previously discussed.

Figure 4:
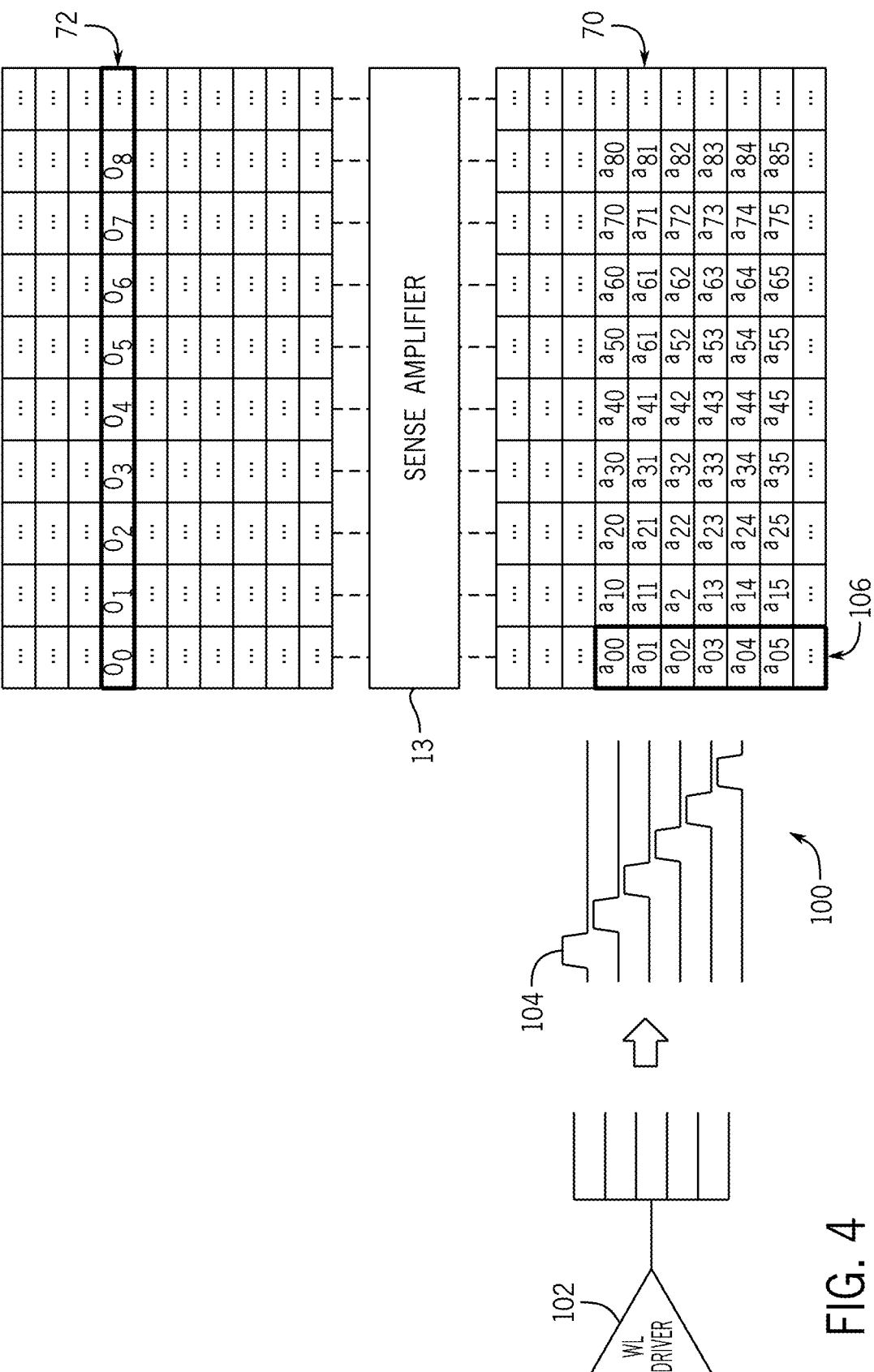
FIG. 4 is a block diagram of a part of the portion of FIG. 1 showing portions of the sense amplifier, the memory bank, and the bank controls used to generate an offset voltage and an output value, according to an embodiment of the present disclosure.

FIG. 4 is a block diagram of a system 100 for performing the offset voltage generation and computing a result from a comparison of the offset voltage and the stored MAC value. As discussed in relation to FIG. 3, the MAC sum is stored on a digit line (e.g., DLT) of the column 94 while the other digit line (e.g., DLF) may be pre-charged to a voltage (e.g., VBLP). Then, a WL driver 102 opens and closes cells in the offset group 70 using pulses 104. In other words, the pulses 104 serially connect and disconnect each of the stored values in a DAC code 106 for the column. The DAC code 106 indicates how much charge is to be added to the precharge level of the other digit line to generate the offset voltage. For instance, if DAC code 106 is six bits containing a value of "011110," for the four middle bits the offset voltage is increased as the charge for each respective is added to the other digit line (e.g., DLF).

In some embodiments, the DRAM may be capable of computing a size of the length of the digit lines (e.g., 1,000 input parameters) and half of a WL length (e.g., 500 weights) simultaneously. This parallelism may be further increased by using multiple sense amplifiers 13 computing at the same time. Furthermore, as the size of the input parameters increase, the width and number of bits in the offset group 70 and output group 72 should also increase.

Figure 5:
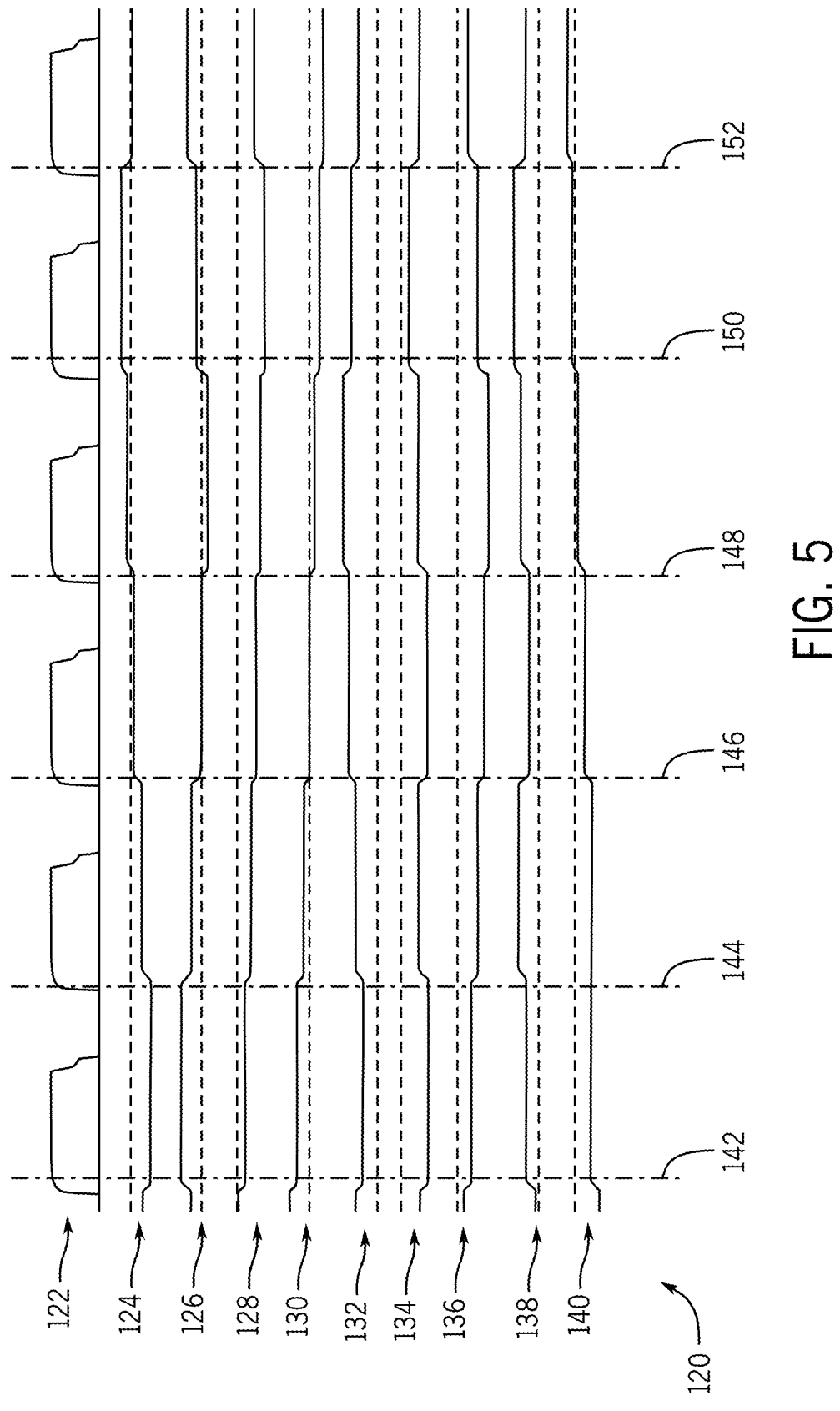
FIG. 5 is a timing diagram of offset voltage generation of FIG. 4 using nine columns and a six-bit digital-to-analog conversion (DAC) code, according to an embodiment of the present disclosure.

FIG. 5 shows a timing diagram 120 showing generation of offset voltages on digit lines of nine columns. The timing diagram 120 includes lines 122 corresponding to the pulses 104 that pulse six different WLs in order with each WL corresponding to a pulse and a bit of the DAC code 106 of each of the nine columns. Line pairs 124, 126, 128, 130, 132, 134, 136, 138, and 140 each correspond to voltages on a digit line pairs: the true digit line (DLT) and the complementary digit line (DLF). DLT is indicated by a solid line, and DLF is indicated by a dashed line. The pulses cause the respective WLs to activate at times 142, 144, 146, 148, 150, and 152. The line pair 124 corresponds to a value of "011110" that causes the DLF of line pair 124 to increase at times 144, 146, 148, and 150. The line pair 126 corresponds to a value of "100011" that causes the DLF of line pair 126 to increase at times 142, 150, and 152. The line pair 128 corresponds to a value of "000001" that causes the DLF of line pair 128 to only increase at time 152. The line pair 130 corresponds to a value of "000000" that causes the DLF of line pair 130 to not increase at all and only decrease after each pulse. The line pair 132 corresponds to a value of "011100" that causes the DLF of line pair 132 to increase at times 144, 146, and 148. The line pair 134 corresponds to a value of "010110" that causes the DLF of line pair 134 to increase at times 144, 148, and 150. The line pair 136 corresponds to a value of "000011" that causes the DLF of line pair 136 to increase at times 150 and 152. The line pair 138 corresponds to a value of "110110" that causes the DLF of line pair 138 to increase at times 142, 144, 148, and 150. The line pair 140 corresponds to a value of "111111" that causes the DLF of line pair 140 to increase at times 142, 144, 146, 148, 150, and 152. In other words, when the bits of the DAC code 106 store a logic high value, activation of the corresponding WL causes the voltage of the DLF to increase. Likewise, when the bits of the DAC code 106 store a logic low value, activation of the corresponding WL causes the voltage of the DLF to decrease.

Returning to FIG. 4, once the digit line has the MAC sum stored, and the other digit line has the offset voltage stored, activating the sense amplifier 13 results in the BNN computation of the offset voltage subtracted by the MAC sum. This value of 1 (+1) or 0 (−1) may then be stored in the output group 108 by activating a corresponding WL (or WLs).

Figure 6:
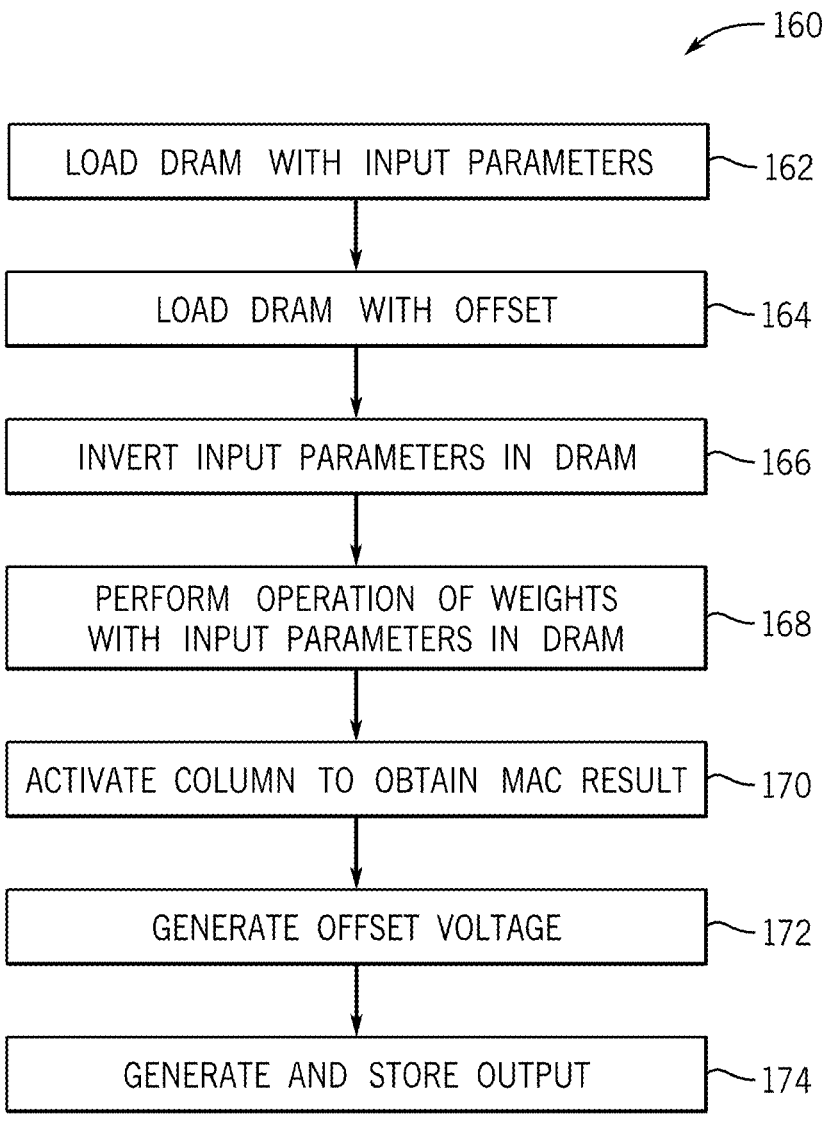
FIG. 6 is a flow diagram of a process for performing in-DRAM MAC computations in the charge domain, according to an embodiment of the present disclosure.

FIG. 6 is a block diagram of a process 160 for performing in-memory computation in the charge domain. The DRAM memory bank 12 is loaded with input parameters (block 162). In other words, the input parameters are written to the first group 66 using a memory write. Likewise, the DRAM memory bank 12 is loaded with the offset as a DAC code 106 for each column to be computed (block 164). Like the input parameters, the offset may be loaded using a memory write but to the offset group 72 instead of the first group 66. The offsets and the input parameters may be written at the same time or at different times. Once the DRAM is loaded with the input parameters, the inverse of the input parameters may be stored in the second group (block 166). As previously noted, these inverted values may be loaded by activating a WL in the first group 66, then enabling the sense amplifier 13, and then firing a corresponding WL in the second group 68. The weights 82 are then used to activate corresponding WL drivers according to the value of the weights 82 to cause an operation of the weights 82 and the input parameters of the first group 66 or the inverted input parameters of the second group 68 (block 168). For instance, the demultiplexer 84 may be used to select the WL 86 of the first group 66 for first values (e.g., 1) and to select the WL 90 of the second group for second values (e.g., 0). The column 94 is then activated to get a MAC result (block 170). This MAC result may be on the DLT and the DLF of the column. The system then generates an offset voltage from the offset (block 172). Generating the offset voltage may include pre-charging DLF to a set voltage (e.g., VBLP) then sequentially connecting bits of the DAC code 106 to the column to generate the offset voltage. The column then generates the result of the BNN compare in the charge domain and stores the result in the output group 72 of cells (block 174). For example, the sense amplifier 13 may be activated to cause the offset voltage and the MAC result to be compared. If the offset voltage is lower than the MAC result, the output is a first output value (e.g., 1 corresponding to +1 in the BNN). Otherwise, the output is a second output value (e.g., 0 corresponding to −1 in the BNN). This generation and storage of the output values may occur for each column and may be stored in one or more rows of the output group 72. These output values may be output as an output of the BNN and/or may be used as inputs to a next convolutional layer.

Figure 7:
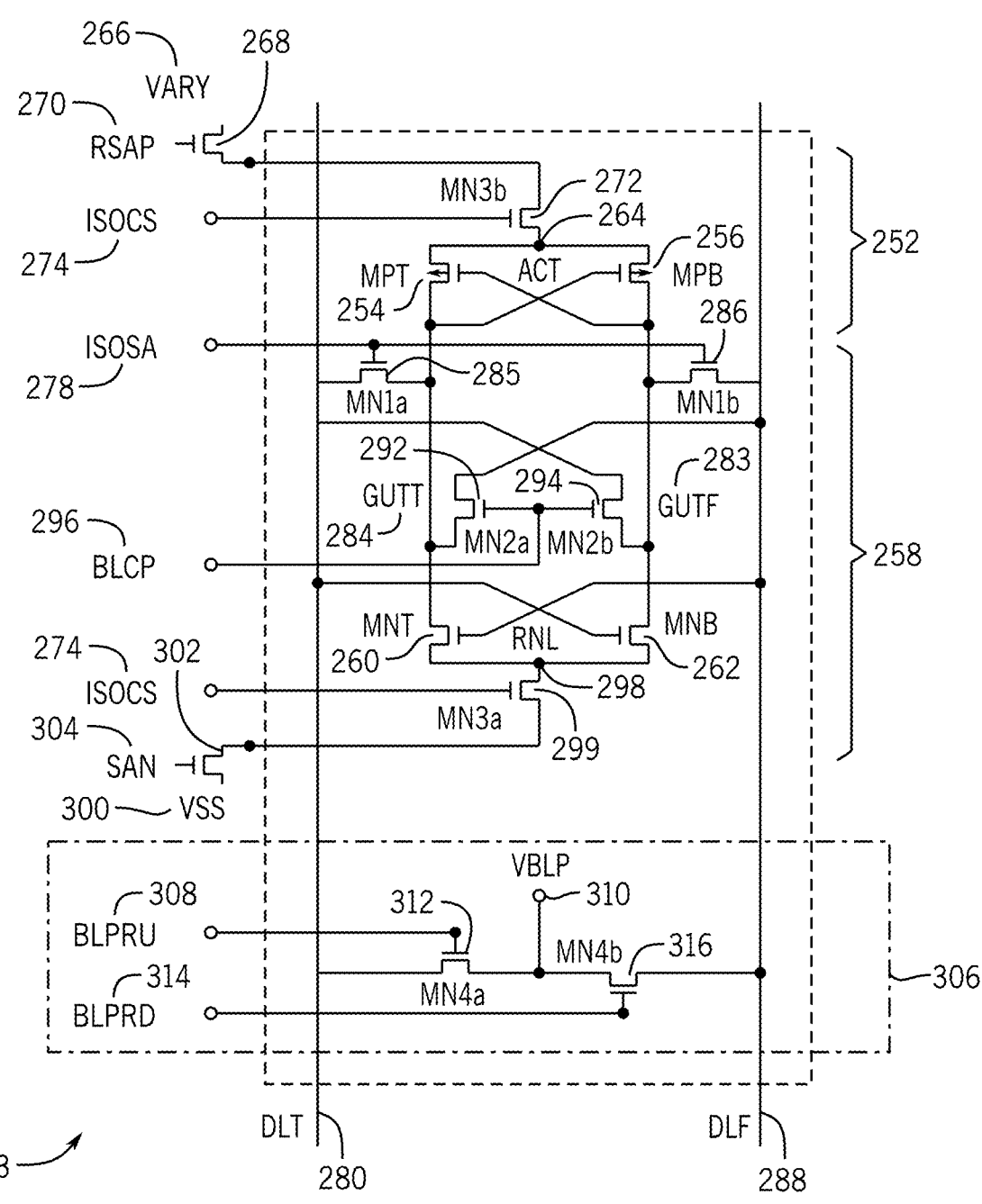
FIG. 7 is a circuit diagram of a sense amplifier of FIG. 1 that is configured to perform in-DRAM MAC computations in the charge domain and including threshold voltage compensation (VTC) circuitry, according to an embodiment of the present disclosure.

FIG. 7 is a circuit diagram of a sense amplifier 13 that may be implemented as an embodiment shown in FIG. 1 that may be used to perform a voltage threshold compensation (VTC). Although only a single sense amplifier 13 is shown, multiple sense amplifiers 13 are included in the memory device 10 that function similarly and may share at least some control signals and/or supply voltages.

As illustrated, the sense amplifier 13 includes a PSA portion 252 that includes PMOS transistors MPT 254 and MPB 256. The sense amplifier 13 also includes an NSA portion 258 that includes NMOS transistors MNT 260 and MNB 262. The MPT 254 and MPB 256 receive an ACT signal 264 at terminals (e.g., source terminals) of the MPT 254 and MPB 256 via a "top node." Although the illustrated embodiment shows both of the MPT 254 and MPB 256 coupled to the same ACT signal 264 and thus receiving the same voltage, some embodiments of the sense amplifier 13 may connect the MPT 254 and MPB 256 to different ACT signals to enable the source terminals of the MPT 254 and MPB 256 to be driven at different voltage levels. The ACT signal 264 is generally used to control data movement and control of the sense amplifier 13. The ACT signal 264 may be driven using an array voltage (VARY) 266 that is selectively coupled and decoupled from the MPT 254 and MPB 256 as the ACT signal 264 by a transistor 268 controlled using an SAP signal 270.

An isolating transistor (MN3b) 272 may be used to separate the transistor 268 (and VARY 266) from MPT 254 and MPB 256 essentially isolating the sense amplifier 13 from the SAP 270 signal based on assertion of an isolation (ISOCS) signal 274. This avoids common source leakage during charge accumulation during the MAC summation operation.

A terminal (e.g., drain) of the MPT 254 is coupled to the DLT 280 that is selectively coupled to a gut node true (GUTT) 284, and another terminal (e.g., drain) of the MPB 256 is coupled to the DLF 288 that is selectively couple to a gut node bar (GUTB) 283. The gate terminal of the MPT 254 is also coupled to the GUTB 283, and the gate terminal of the MPB 256 is also coupled to the GUTT 284. In other words, the MPT 254 and the MPB 256 are cross-coupled PMOS transistors coupled between the gut nodes and the ACT signal 264. As previously discussed, the sense amplifier 13 receives signals from a memory cell and amplifies any difference. The sense amplifier 13 is selectively coupled to the memory cell via digit lines DLT 280 and DLF 288. DLT 280 carries the value (e.g., 1) from the memory cell indicating the value of a stored bit while DLF 288 is complementary to the value (e.g., 0). An isolation ISOSA signal 278 may be used to selectively couple and decouple the GUTT 284 to and from DLT 280 via transistor MN1a 285 and to selectively couple and decouple the GUTB 283 to and from the DLF 288 via transistor MN1b 286. Transistors MN2a 292 and MN2b 294 may be used to couple DLF 288 to GUTT 284 and to couple DLT 280 to GUTB 283, respectively, using a BLCP signal 296.

The MNT 260 has a terminal (e.g., source terminal) coupled to the GUTT 284 while the gate terminal of the MNT 260 is coupled to the DLF 288. Similarly, the MNB 262 has a terminal (e.g., source terminal) coupled to the GUTB 283 while the gate terminal of the MNB 262 is coupled to the DLT 280. The other terminals of the NMOS transistors MNT 260 and MNB 262 are coupled together to an RNL signal 298. The RNL signal 298 (e.g., NMOS strobe signal) may be a selectable voltage that may strobe the MNT 260 and MNB 262 to a voltage level (e.g., ground/VSS 300) to complete latching once amplification in the sense amplifier 13 has amplified the relatively low voltage from the memory cell. For instance, this RNL signal 298 may transition to VSS 300 for such latching via a transistor 302 when a SAN signal 304 is asserted. However, a transistor MN3a 299 may use the ISOCS signal 274 to isolate the sense amplifier 13 from the SAN signal 304 to avoid leaking during the MAC accumulation operation.

In operation, the sense amplifier 13 of FIG. 7 may operate using VTC that compensates threshold voltage offsets of a combination of the MPT 254, the MPB 256, the MNT 260, and the MNB 262. Furthermore, since both the DLT 280 and the DLF 288 are to be utilized in the accumulation in the column 94, they are shorted together by asserting the BLCP signal 296 and the ISOSA signal 278 during accumulation. They may be isolated after the MAC sum is generated so that the DLF 288 may be pre-charged to another voltage.

The sense amplifier 13 also includes a pre-charge portion 306 that may utilize a pre-charge (BLPRU) signal 308 to selectively enable the DLT 280 to be charged to VBLP 310 using a transistor 312. Likewise, the pre-charge portion 306 may utilize a pre-charge (BLPRD) signal 314 to selectively enable the DLF 288 to be pre-charged to VBLP 310 separately from the DLT 280 using a transistor 316. Thus, the DLF 288 may be pre-charged as part of or in preparation for the offset voltage generation previously discussed.

Figure 8:
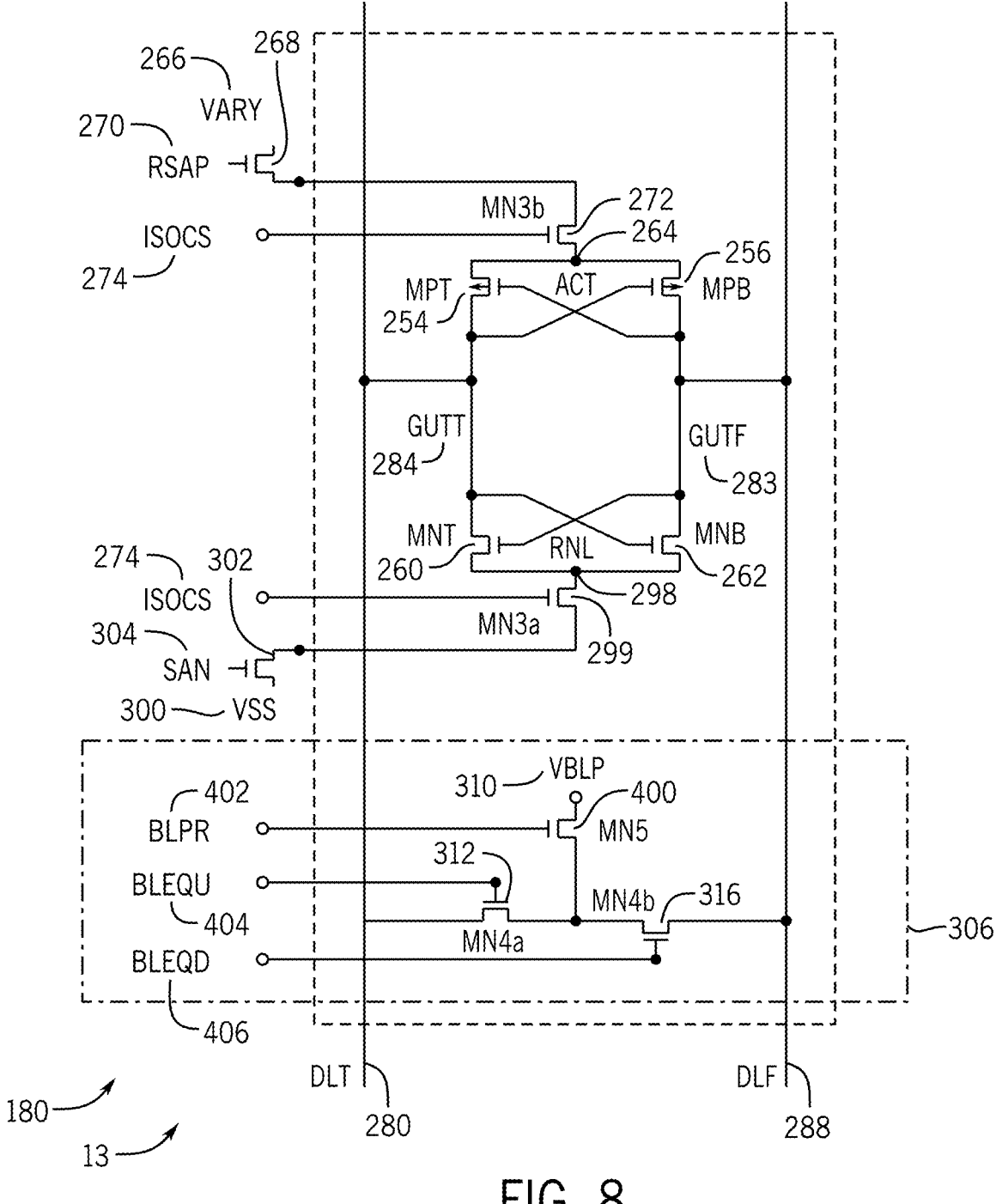
FIG. 8 is a circuit diagram of a sense amplifier of FIG. 1 that is configured to perform in-DRAM MAC computations in the charge domain without VTC circuitry, according to an embodiment of the present disclosure.

FIG. 8 is a circuit diagram of a sense amplifier 13 that may be implemented as an embodiment shown in FIG. 1 that may not include VTC circuitry. In other words, the sense amplifier 13 of FIG. 8 is similar to the sense amplifier 13 of FIG. 7 except that there is no ISOSA signal 278, transistor MN1*a* 285, or transistor MN1*b* 286. Thus, to perform equalization, the pre-charge portion 306 includes a transistor MN5 400 to be enabled by shorting the DLT 280 and the DLF 288 together during accumulation. Specifically, when pre-charging signal (BLPR) 402 is not asserted, but equalization (BLEQU) signal 404 and equalization (BLEQD) signal 406 are asserted, the DLT 280 and the DLF 288 are shorted together. The BLEQU signal 404 may be used to enable the DLT 280 to be shorted to the DLF 288 and/or charged to VBLP 310. The BLEQD signal 406 may be used to enable the DLF 288 to be shorted to the DLT 280 and/or charged to VBLP 310. In other words, if the BLPR signal 402 is asserted, assertion of a respective equalization signal (e.g., BLEQU signal 404 or BLEQD signal 406) may enable the DLF 288 to be charged to VBLP 310. For instance, after the MAC sum is stored on the DLT 280 and the DLF 288, BLEQU signal 404 may be de-asserted to separate DLT 280 from DLF 288. Then, the BLPR signal 402 may be asserted to pre-charge DLF 288 to VBLP 310 in preparation for and/or part of the offset voltage generation previously discussed.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a weight register configured to store weights;
a plurality of word lines;
a plurality of digit lines;

a demultiplexer configured to route the weights through corresponding word lines of the plurality of word lines based at least in part on values of the weights;
a plurality of multi-bit cells in dynamic random access memory (DRAM) configured to perform in-memory computation in the DRAM comprising:
a first group of bits used to store input parameters;
a second group of bits used to store inverted values of the input parameters each in a respective bit corresponding to the respective bits of the input parameters, wherein the plurality of word lines are configured to cause the weights to be combined with corresponding input parameters or inverted values to form combined values and to cause the combined values in a plurality of columns of the plurality of multi-bit cells to be accumulated on respective first digit lines of the plurality of digit lines;
a third group of bits with each column configured to store an indication of an offset voltage to be generated on a corresponding second digit line of the plurality of digit lines; and
a fourth group of bits configured to store an output of a comparison between respective combined values on the first digit lines and respective offset voltages on the second digit lines; and
a plurality of sense amplifiers configured to perform the comparison for respective columns of the first group and the second group, wherein each of the plurality of sense amplifiers is configured to perform threshold voltage compensation, wherein accumulating the combined values of respective columns comprises shorting the respective first digit lines and the second digit lines together by asserting a pair of signals, wherein generating the offset voltage comprises stopping the shorting of the respective first digit lines and the second digit lines together after accumulation has been completed, and wherein generating the offset voltage also comprises pre-charging the respective second digit lines and changing charge on the respective second digit lines by a number of pulses and values indicated by the respective indications.

2. The system of claim 1, comprising a convolutional neural network implemented in a memory device that comprises the weight register, the plurality of word lines, the demultiplexer, and the plurality of multi-bit cells.

3. The system of claim 1, wherein combining the weights with the corresponding input parameters or inverted values comprises an exclusive not OR (XNOR) operation.

4. The system of claim 1, wherein each of the plurality of sense amplifiers, as part of the offset voltage generation, is configured to:
equalize the respective first digit lines and the respective second digit lines by disabling pre-charge and enabling equalization signals for the respective first digit lines and the respective second digit lines;
disable equalization for the respective second digit lines after accumulation;
pre-charge the respective digit lines after equalization is disabled; and
change charge on the respective digit lines by a number of pulses and values indicated by the respective indications.

5. A method for computing in-dynamic random access memory (DRAM) computing, comprising:
loading a first group of cells of the DRAM with input parameters for computing in-memory in the DRAM;

loading a second group of cells of the DRAM with inverted input parameters that are each complementary to corresponding input parameters;

loading an offset group of cells of the DRAM with an indication of an offset voltage;

performing an operation of weights with corresponding stored input parameters or stored inverted input parameters;

activating a column of the first group and the second group to perform an accumulation of the operations of weights for cells in the column to store a sum;

generating an offset voltage in the column using the indication;

generating an output based on the sum and the offset voltage and storing the output in an output group of cells of the DRAM as a result for in-memory computation performed in the DRAM;

selecting a word line of the first group based on a first value of a first weight of the weights; and selecting a word line of the second group based on a second value of a second weight of the weights, wherein the first value and second value are logic complements.

6. The method of claim 5, wherein loading the first group comprises a memory write to the first group.

7. The method of claim 5, wherein loading the second group comprises a memory write to the second group.

8. The method of claim 5, wherein loading the second group comprises an inversion of the input parameters of the first group to the inverted input parameters of the second group by:

activating a word line of the first group, activating a sense amplifier, and activating a word line of the second group to store the inversion of values to the second group.

9. The method of claim 5, wherein the indication comprises a digital-to-analog code that indicates a number of pulses adding charge to generate the offset voltage.

10. The method of claim 5, wherein the operation comprises an exclusive not OR (XNOR) operation.

11. The method of claim 5, wherein storing the sum comprises storing the sum on two digit lines of the column.

12. The method of claim 11, wherein generating the offset voltage comprises:

maintaining storage of the sum on a first digit line of the two digit lines; and generating the offset voltage on a second digit line of the two digit lines.

13. The method of claim 12, comprising pre-charging the second digit line before generating the offset voltage on the second digit line.

14. The method of claim 5, comprising using the output in a binary neural network (BNN).

15. A method for computing in-dynamic random access memory (DRAM) computing, comprising:

loading a first group of bits in a first array core of the DRAM with input parameters;

loading a second group of bits in a second array core of the DRAM with inverted input parameters that are complementary to respective input parameters;

loading an offset group of bits of the DRAM with an indication of an offset voltage;

multiplying weights with corresponding stored input parameters or inverted input parameters in a charge domain by selecting the first group when the weights have a first value and by selecting the second group when the weights have a second value;

activating a column including the first group and the second group to perform an accumulation of operations of weights for cells in the column in the charge domain to store a sum on a first digit line of the column;

generating an offset voltage in the column using the indication by putting an amount of charge on a second digit line, wherein the amount of charge is based at least in part on the indication, wherein each of a plurality of sense amplifiers, as part of the offset voltage generation is configured to:

equalize respective first digit lines and respective second digit lines by disabling pre-charge and enabling equalization signals for the respective first digit lines and the respective second digit lines;

disable equalization for the respective second digit lines after accumulation;

pre-charge the respective digit lines after equalization is disabled; and change charge on the respective digit lines by a number of pulses and values indicated by respective indications;

generating an output based on a comparison in the charge domain of the sum on the first digit line and the offset voltage on the second digit line by activating a sense amplifier of the plurality of sense amplifiers to perform the comparison; and storing the output in an output group of bits of the DRAM via the sense amplifier as a result for in-memory computation performed in the DRAM.

16. The method of claim 15, wherein multiplying comprises an XNOR operation of respective weights and stored input parameters or inverted input parameters.

17. The method of claim 15, wherein the offset group is in the second array core, and the output group is in the first array core.

18. The method of claim 15, wherein the first value and the second value are complements.

19. The method of claim 15, wherein loading the first group of bits comprises a memory write to the first group of bits.

20. The method of claim 15, wherein loading the second group of bits comprises a memory write to the second group of bits.

* * * * *